United States Patent [19]

Sato et al.

[11] Patent Number: 4,483,971
[45] Date of Patent: * Nov. 20, 1984

[54] PROCESS FOR PRODUCING TERPOLYMERS OF PROPYLENE, ETHYLENE AND ANOTHER α-OLEFIN

[75] Inventors: Akihiro Sato, Chibaken; Takeshi Suzuki, Ichiharashi; Kazutsune Kikuta, Ichiharashi; Hiromasa Chiba, Ichiharashi; Toshihiro Uwai, Ichiharashi; Kenji Matsuda, Ichiharashi; Tohru Hanari, Ichiharashi, all of Japan

[73] Assignee: Chisso Corporation, Osaka, Japan

[*] Notice: The portion of the term of this patent subsequent to Jan. 5, 1999 has been disclaimed.

[21] Appl. No.: 469,926

[22] Filed: Feb. 25, 1983

Related U.S. Application Data

[63] Continuation of Ser. No. 252,391, Apr. 9, 1981, abandoned.

[30] Foreign Application Priority Data

Apr. 11, 1980 [JP] Japan .................................. 55-47742

[51] Int. Cl.$^3$ ...................... C08F 4/64; C08F 210/02
[52] U.S. Cl. .................................. 526/142; 502/127; 526/114; 526/116; 526/119; 526/122; 526/127; 526/137; 526/139; 526/140; 526/141; 526/348.2; 526/348.5; 526/348.6; 526/904; 525/268

[58] Field of Search ...................... 526/142, 904, 119; 525/268

[56] References Cited

U.S. PATENT DOCUMENTS

| | | | |
|---|---|---|---|
| 3,769,373 | 10/1973 | Reed et al. | 526/153 |
| 3,959,409 | 5/1976 | Frese et al. | 525/247 |
| 4,161,574 | 7/1979 | Strametz et al. | 526/348.6 |
| 4,200,717 | 4/1980 | Abe et al. | 526/142 |
| 4,210,729 | 7/1980 | Hermans et al. | 526/142 |
| 4,234,710 | 11/1980 | Moberly et al. | 526/125 |
| 4,235,747 | 11/1980 | Leung | 526/142 |
| 4,269,732 | 5/1981 | Kortbeek et al. | 526/142 |
| 4,304,890 | 12/1981 | Suzuki et al. | 526/142 |
| 4,309,521 | 1/1982 | Sato et al. | 526/142 |
| 4,367,322 | 1/1983 | Shiga et al. | 526/137 |

*Primary Examiner*—Edward J. Smith
*Attorney, Agent, or Firm*—Fred Philpitt

[57] ABSTRACT

A process for producing terpolymers of propylene (as a main monomer), ethylene and another α-olefin having superior and well-balanced physical properties, almost without forming soluble polymer is provided.

This process is characterized by preliminarily activating a catalyst consisting of a titanium trichloride composition and a specified organoaluminum halide, with a small amount of an α-olefin of 2 to 12 carbon atoms, a trialkylaluminum and an aromatic ester, and copolymerizing specified amounts of propylene, ethylene and an α-olefin of 4 to 12 carbon atoms in the presence of the preliminarily activated catalyst obtained above.

7 Claims, No Drawings

PROCESS FOR PRODUCING TERPOLYMERS OF PROPYLENE, ETHYLENE AND ANOTHER α-OLEFIN

This is a continuation of application Ser. No. 252,391, filed Apr. 9, 1981, now abandoned, and the benefits of 35 USC 120 are claimed relative to it.

BACKGROUND OF THE INVENTION

1. Field of the Invention

This invention relates to a process for producing ethylene-propylene-α-olefin terpolymers.

More particularly, it relates to a process for producing the terpolymers by copolymerizing ethylene, propylene and another α-olefin in a specified proportion of their amounts in the presence of a catalyst obtained by preliminarily activating specified catalyst components with an α-olefin, a trialkylaluminum and an aromatic ester.

The terpolymers produced by the process of the present invention are particularly suitable for processing them into cold-proof films, i.e. films for winter season or for packaging frozen goods, films which are heat-sealable at low temperature, heat-shrinkable films, highly transparent films, seats for multi-ply blow, etc.

2. Description of the Prior Art

The art of molding and processing polypropylene into films, sheets, etc. has been well known, and it has been desired to produce polypropylene which can be processed into or is suitable for molded products having superior practical physical properties required for the products, such as low-temperature impact resistance, heat-sealability by itself at relatively low temperature (referred to hereinafter as low-temperature heat-sealability), hot shrinkability exhibited when processed into stretched film (referred to hereinafter as heat-shrinkability), etc. For such a purpose, there has been effective and practically employed a process wherein a small amount of other copolymerizable component(s) is in advance mixed with a large amount of polypropylene at a suitable time and in a suitable amount in the above-mentioned production to obtain propylene copolymer and thereby improve the above-mentioned practical physical properties as compared with propylene homopolymer.

However, such an improvement in the processing physical properties of polypropylene according to the above-mentioned copolymerization process has also raised a problem. Namely, for example, in case where an ethylene-propylene (two-component system) random copolymer is obtained by a process wherein a small amount of ethylene as a copolymerizable component is in advance mixed with propylene followed by polymerization, the transparency and rigidity of molded products obtained from the resulting copolymer are remarkably reduced with the increase of the ethylene content in the copolymer; besides, when the copolymer is molded into a film which is then processed into a bag form, the end-opening property of the bag (referred to hereinafter as end-opening property) is inferior; and further, when the random copolymer is produced, the amount of soluble (atactic) polymer byproduced, which is useless as plastics, notably increases.

Thus, improvements in the above-mentioned various processing physical properties according to known two-component system random copolymerization process are restricted with respect of physical properties of the resulting polymer as well as production yield of the polymer.

Further, processes for producing terpolymers (three-component system) consisting of ethylene, propylene and an α-olefin (as illustrated in Japanese patent application laid-open No. 35487/1974), are superior in the reduction of the amount of soluble polymer related to polymer yield, as well as in the transparency, etc. as processing physical properties of polymer, but the amount of soluble polymer byproduced is still yet large presumably since usual Ziegler-Natta system catalyst is employed. Furthermore, the terpolymers according to the above-mentioned process are still yet insufficient in the low-temperature impact strength and end-opening property as practical physical properties other than the above-mentioned transparency, and in addition, they are also insufficient in the usual physical properties such as rigidity, Young's modulus, etc.

The reason for this is that consumers have been gradually demanding molded products of polypropylene, particularly films and sheets as mentioned above, having a higher level of performances or physical properties; hence evaluation of the physical properties of polypropylene employed, made by processors producing such molded products has also been becoming severer. More concretely, if a molded product of polypropylene is superior in a physical property, but inferior in another to the average level thereof, then the overall evaluation of the product is made based on the latter inferior physical property. Thus, even when improvement in one or two or more practical physical properties is aimed, notable reduction in other practical or usual physical properties cannot be permitted, and on the other hand, in order to carry out propylene polymerization smoothly and economically, it is necessary to further reduce the amount of soluble polymer byproduced than those in the prior art.

In order to solve the above-mentioned technical problems, the present inventors previously proposed a process for producing terpolymers consisting of ethylene, propylene and another α-olefin of 4 carbon atoms or more (Japanese patent application No. 3985/1975), and further proposed an improved process over the above-mentioned (Japanese patent application laid-open No. 127994/1977).

The present inventors have made strenuous studies for further improving these processes of the prior applications, and as a result have found that multi-component system copolymers having further superior physical properties to those according to the prior art can be obtained by specializing the catalyst employed and also specifying the polymerization conditions employed in the above-mentioned processes, and also the proportion of soluble polymer byproduced can be further reduced. The present invention has been attained based on this finding.

SUMMARY OF THE INVENTION

As is apparent from the above description, a first object of the present invention is to provide multi-component system copolymers composed mainly of propylene having superior physical properties to those according to the prior art, and a process for producing the same; a second object of the present invention is to provide a catalyst to be employed for such a polymerization process; and a third object of the present invention is to provide a process as mentioned above and yet having no soluble polymer byproduced in the copolymerization.

The present invention resides in the production processes described in the following items (1)~(3), and terpolymers described in the following items (4) and (5):

(1) A process for producing terpolymers of ethylene, propylene and another α-olefin, which comprises
preliminarily activating a catalyst consisting of a titanium trichloride composition and an organoaluminum halide expressed by the general formula $AlR_1R_2X$ wherein $R_1$ and $R_2$ are the same or different alkyl, aryl or alkaryl groups and X represents a halogen atom (which organoaluminum halide will be hereinafter abbreviated to $AlR_1R_2X$), with an α-olefin of 2 to 12 carbon atoms, a trialkylaluminum and an aromatic ester, and
copolymerizing 1.0 to 3.5% by weight of ethylene, 88 to 96% by weight of propylene and 1.0 to 10.0% by weight of another α-olefin of 4 to 12 carbon atoms based on the total weight of these monomers, in the presence of the preliminarily activated catalyst obtained above.

(2) A process according to the item (1) wherein said preliminary activation is carried out so that the amount of poly-α-olefin formed in the preliminary activation corresponds to 1 to 5% by weight based on the weight of the terpolymers after said copolymerization.

(3) A process according to the item (1) wherein said copolymerization is carried out at a temperature of 45° to 65° C.

(4) Terpolymers of ethylene, propylene and another α-olefin obtained by
preliminarily activating a catalyst consisting of a titanium trichloride composition and an organoaluminum halide expressed by the general formula $AlR_1R_2X$ (wherein $R_1$ and $R_2$ are the same or different alkyl, aryl or alkaryl groups and X represents a halogen atom), with a small amount of an α-olefin of 2 to 12 carbon atoms, a trialkylaluminum and an aromatic ester, and
copolymerizing 0.1 to 3.5% by weight of ethylene, 88 to 96% by weight of propylene and 1.0 to 10.0% by weight of another α-olefin of 4 to 12 carbon atoms based on the total weight of these monomers, in the presence of the preliminarily activated catalyst obtained above,
the total amount of ethylene units and said another α-olefin units in said terpolymers being in the range of the following equation (1):

% by weight of ethylene units + $A \cdot$ % by weight of     (1)
α-olefin units = 3.0 to 5.0% by weight wherein when said another α-olefin is butene-1, pentene-1 hexene-1, heptene-1, octene-1, nonene-1, decene-1, undecene-1 or dodecene-1, A is 0.287, 0.385, 0.455, 0.505, 0.556, 0.629, 0.667, 0.714 or 0.769, respectively.

(5) Terpolymers according to the item 4 wherein said copolymerization is carried out at a temperature of 45° to 65° C.

DESCRIPTION OF THE PREFERRED EMBODIMENTS

The present invention will be further described in detail.

As the titanium trichloride composition (A) employed in the present invention, usual titanium trichloride may be employed, but it is preferable for attaining the objects of the present invention to employ the following compositions:

(i) those obtained by reducing $TiCl_4$ with metallic aluminum, removing excess $TiCl_4$, activating the resulting material by milling, and mixing and milling the resulting product together with a reaction mixture of $TiCl_4$ with an ether (these compositions will be hereinafter referred to as titanium trichloride composition ($A_1$));

(ii) those obtained by reaction product (I) of an organoaluminum compound with an electron donor (which will be hereinafter referred to as reaction product (I)), with $TiCl_4$ to obtain a solid product (II) (which will be hereinafter referred to as solid product (II)) and further reacting this solid product (II) with an electron donor and an electron acceptor (these compositions will be hereinafter referred to as titanium trichloride composition ($A_2$)); and (iii) those obtained by reducing $TiCl_4$ with an organoaluminum compound removing excess $TiCl_4$, reacting the resulting reduction solid product with an electron donor, removing unreacted electron donor, and treating the resulting material with an electron acceptor and an electron donor (these compositions will be hereinafter referred to as titanium trichloride composition ($A_3$)).

A supplementary explanation will be made with the above-mentioned compositions (I)~(iii).

The above-mentioned reaction mixture of $TiCl_4$ with an ether refers to that obtained by reacting $TiCl_4$ with an ether, for example, at room temperature and the atmospheric pressure. The ether employed refers to organic compounds (mainly hydrocarbons) having one or more ether linkages in their molecule. For example, diethyl ether, n-butyl ether, n-propyl ether, isobutyl ether, methyl butyl ether, amyl ether, tetrahydrofuran, dioxane, diethylene glycol dimethyl ether, etc. are mentioned. Among them, diethyl ether and n-butyl ether are preferable. Mixing and milling of the above-mentioned reaction mixture together with the above-mentioned titanium trichloride composition obtained by reducing $TiCl_4$ with metallic aluminum, removing excess $TiCl_4$ and activating the resulting material by milling, is disclosed in e.g. Japanese patent publication No. 9751/1975. Namely, as for the mill employed, usual ball mill, vibration mill, air mill, column type mill, ring mill, impact mill, etc. are mentioned. Milling time is several hours or longer; milling temperature is in the range of room temperature to 200° C.; and the ratio by weight of titanium trichloride to the reaction mixture of $TiCl_4$-ether is in the range of 1:0.001 to 1:0.3.

The titanium trichloride composition ($A_2$) is prepared as follows:

First, an organoaluminum compound is reacted with an electron donor to obtain a reaction product (I). This reaction is carried out in a solvent at a temperature of −20° C. to 200° C., preferably −10° C. to 100° C., for a time of 30 seconds to 5 hours. The addition order of organoaluminum, electron donor and solvent has no limitation, and as for the proportion of their amounts employed, 0.1 to 8 mols, preferably 0.2 to 3 moles of electron donor and 0.1 to 5 l of solvent, based on one mol of organoaluminum, are suitable. As for the solvent, aliphatic hydrocarbons such as n-pentane, n-hexane, n-heptane, n-octane, i-octane, etc., aromatic hydrocarbons such as benzene, toluene, xylene, etc., halogenated hydrocarbons such as tetrachloromethane, chloroform, dichloroethane, trichloroethylene, tetrachloroethylene, etc. may be employed.

The reaction product (I) thus obtained is reacted with TiCl₄ to obtain a reaction product (II). This reaction may be carried out without any solvent, but it is most preferable to carry out it employing an aromatic hydrocarbon solvent at a temperature of −20° C. to 200° C., preferably −5° to 100° C., and it is desirable to mix solvent, reaction product (I) and TiCl₄ in an optional order within 180 minutes and then continue reaction for 5 minutes to 5 hours. As for the respective amounts employed in the reaction, the amount of solvent is in the range of 0 to 3,000 ml based on one mol of TiCl₄, and the ratio of the number of Al atoms in the reaction product (I) to the number of Ti atoms in TiCl₄ (Al/Ti) is in the range of 0.05 to 10. After completion of the reaction, an electron donor and an electron acceptor may be added, followed by reaction, but it is preferable to separate and remove the liquid portion by filtering-off or decantation and further repeat washing with solvent, followed by employing the resulting solid product (II) suspended in solvent as it is, in the next step, or by further drying it and taking out as solid and employing in the next step. As for the solvent employed for the reaction of the solid product (I) with TiCl₄, beside the solvents employed in the reaction of electron donor with organoaluminum, aromatic compounds such as aromatic hydrocarbons, e.g. naphthalene, their alkyl substitutes, e.g. mesitylene, durene, ethylbenzene, isopropylbenzene, 2-ethylnaphthalene, 1-phenylnaphthalene, their halides, e.g. monochlorobenzene, orthodichlorobenzene, etc. are illustrated. These aromatic compounds may be employed alone or in admixture, or may be mixed with an aliphatic hydrocarbon such as n-pentane, n-hexane, n-heptane, so as to contain the aromatic compounds in an amount of 10% by volume or more.

Finally, the solid product (II) thus prepared is further reacted with an electron donor and an electron acceptor to obtain a titanium trichloride ($A_2$). This reaction may also be carried out without any solvent, but it may be also carried out with an aliphatic hydrocarbon. The addition order of solid product (II), electron donor, electron acceptor and solvent has no limitation, and their respective amounts employed are 10 to 1,000 g of electron donor, 10 to 1,000 g of electron acceptor and 0 to 3,000 ml of solvent, each based on 100 g of the solid product (II). It is preferable to add them at a temperature of −10° to 30° C. over 30 seconds to 60 minutes, followed by reaction at a temperature of 30° to 200° C. for 30 seconds to 5 hours. After completion of the reaction, the liquid portion is separated and removed by filtering-off or decantation, followed by repeated washings with solvent to obtain a titanium trichloride composition ($A_2$).

The organoaluminum compounds employed for forming the titanium trichloride composition ($A_2$) or ($A_3$) are those expressed by the general formula $AlR_nR'_{n'}X'_{3-(n+n')}$ wherein either one of R or R' represents hydrogen atom and another or both of them represents a hydrocarbon group such as alkyl group, aryl group, alkaryl group, cycloalkyl group or an alkoxy group; X' represents a halogen atom of fluorine, chlorine, bromine or iodine or hydrogen atom; and n and n' each represent an optional number of $0 < n+n' \leq 3$. As concrete examples, trialkylaluminums such as trimethylaluminum, triethylaluminum, tri-n-propylaluminum, tri-n-butylaluminum, tri-i-butylaluminum, tri-n-hexylaluminum, tri-i-hexylaluminum, tri-2-methyl-pentylaluminum, tri-n-octylaluminum, tri-n-decylaluminum; dialkylaluminum monohalides such as diethylaluminum monochloride, di-n-propylaluminum monochloride, di-i-butylaluminum monochloride, diethylaluminum monofluoride, diethylaluminum monobromide, diethylaluminum monoiodide; alkylaluminum hydrides such as diethylaluminum hydride; alkylaluminum sesqui- or di-halides such as methylaluminum sesquichloride, ethylaluminum sesquichloride, ethylaluminum dichloride, i-butylaluminum dichloride, etc. are mentioned. Besides, alkoxyalkylaluminums such as monoethoxydiethylaluminum, diethoxymonoethylaluminum may also be employed.

As for the electron donors employed for forming the titanium trichloride composition ($A_2$) or ($A_3$), organic compounds containing at least one atom of oxygen, nitrogen, sulfur and phosphorus, i.e. ethers, alcohols, esters, aldehydes, carboxylic acids, ketones, nitriles, amines, amides, ureas, thioureas, isocyanates, azo compounds, phosphines, phosphites, phosphinites, thioethers, thioalcohols, etc. are mentioned. As concrete examples, ethers such as diethyl ether, di-n-propyl ether, di-n-butyl ether, di-isoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofurane; alcohols such as methanol, ethanol, propanol, butanol, pentanol, hexanol, octanol; phenols such as phenol, cresol, xylenol, ethylphenol, naphthol; esters such as methyl methacrylate, ethyl acetate, butyl formate, amyl acetate, vinyl butyrate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; carboxylic acids such as formic acid, acetic acid, propionic acid, butyric acid, oxalic acid, succinic acid, acrylic acid, maleic acid, benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino)ethanol, pyridine, quinoline, α-picoline, N,N,N',N'-tetramethylhexaethylenediamine, aniline, dimethylaniline; amides such as formamide, hexamethylphosphoric acid triamide, N,N,N',N',N''-pentamethyl-N'-β-dimethylaminoethylphosphoric acid triamide, octamethylpyrophosphoroamide; ureas such as N,N,N',N'-tetramethyl urea; isocyanates such as phenyl isocyanate, toluyl isocyanante; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; thioalcohols such as ethylthioalcohol, n-propylthioalcohol, thiophenol; etc. are illustrated. These electron donors may be employed alone or in admixture.

The electron acceptors employed for forming the titanium trichloride composition ($A_2$) or ($A_3$) are represented by halides of elements of III~VII groups of the Periodic Table. As for concrete examples, anhydrous aluminum chloride, silicon tetrachloride, stannous chloride, stannic chloride, titanium tetrachloride, zirconium tetrachloride, phosphorus trichloride, phosphorus pentachloride, vanadium tetrachloride, antimony pentachloride, iodine, etc. are mentioned. Among them, titanium tetrachloride is most preferable.

The preliminary activation of catalyst in the present invention is carried out by treating the titanium trichloride composition ($A_1$), ($A_2$) or ($A_3$) obtained according to the above-mentioned preparation (i), (ii) or (iii), with (B) an $AlR_1R_2X$, (C) an α-olefin, ($D_1$) a trialkylaluminum and ($D_2$) an aromatic ester. The preliminary activation can be carried out in various procedures. Main procedures are as follows:

(1) a procedure wherein an α-olefin is reacted with a combination of a titanium trichloride composition with an $AlR_1R_2X$, followed by adding (D) a reaction product of a trialkylaluminum with an aromatic ester;

(2) a procedure wherein a titanium trichloride composition, an $AlR_1R_2X$, and (D) a reaction product of a trialkylaluminum with an aromatic ester are added in the presence of an α-olefin; and (3) a procedure wherein an α-olefin is reacted with a mixture of a titanium trichloride composition, an $AlR_1R_2X$, and (D) a reaction product of a trialkylaluminum with an aromatic ester.

(However, the reaction product (D) of a trialkylaluminum with an aromatic ester is necessary to be added as catalyst components to be added, in advance of initiating the copolymerization of the present invention.)

The preliminarily activated catalyst thus obtained can be employed in slurry polymerization carried out in a hydrocarbon solvent such as n-hexane, n-heptane, n-octane, etc., bulk polymerization carried out in liquefied propylene or gas phase polymerization in an α-olefin gas such as ethylene, propylene, butene-1, etc. Further, as a modification of gas phase polymerization, a process wherein slurry polymerization is carried out, followed by gas phase polymerization or a process wherein bulk polymerization is carried out, followed by gas phase polymerization may be also employed.

As for the $AlR_1R_2X$ employed for the preliminary polymerization, for example, diethylaluminum monochloride, di-n-propylaluminum monochloride, di-i-butylaluminum monochloride, diethylaluminum monofluoride, diethylaluminum monobromide, diethylaluminum monoiodide, etc. are mentioned. Particularly, diethylaluminum monochloride and diethylaluminum monoiodide are preferable.

The α-olefins (C) employed in the preliminary activation are straight or branched chain monoolefins of 2 to 12 carbon atoms. For example, straight chain monoolefins such as ethylene, propylene, butene-1, hexene-1, etc. and branched chain monoolefins such as 4-methylpentene-1, 2-methylpentene-1, etc. are mentioned. Particularly propylene is preferable. However, it is undesirable to employ either two or more of the above-mentioned α-olefins in admixture.

As for the trialkylaluminums ($D_1$) employed in the preliminary activation, for example, trimethylaluminum, triethylaluminum, tri-n-propylaluminum, tri-n-butylaluminum, tri-i-butylaluminum, tri-n-hexylaluminum, tri-n-octylaluminum, etc. are mentioned. However, mixed trialkylaluminums such as monomethyldiethylaluminum, of course, may be also employed.

The aromatic esters ($D_2$) employed in the preliminary activation may be esters of aromatic carboxylic acids. For example, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, etc. are mentioned.

The preliminary activation may be carried out employing 0.1 to 500 g of (B) an $AlR_1R_2X$, 0 to 50 l of a solvent, 0 to 1,000 ml of hydrogen, 5,000 g or less, preferably 1.0 to 1,000 g of (C) an α-olefin and 0.1 to 10 g, preferably 0.5 to 3.0 g of (D) a reaction product of a trialkylaluminum with an aromatic ester, each based on 1 g of (A) a titanium trichloride composition, at a temperature of 0° to 100° C. for one minute to 20 hours, to react 0.5 to 500 g of the α-olefin per g of the titanium trichloride composition. If the amount of the α-olefin reacted in the preliminary activation is less than 0.5 g, there is such a disadvantage that the amount of soluble polymer byproduced increases and also the shape of polymer particles becomes inferior. On the other hand, if the amount exceeds 500 g, the product polymer is inferior in the heat-sealability, transparency, etc.; hence this case is also undesirable. Particularly in case where the catalyst is employed for the gas phase polymerization, it is preferable to polymerize the α-olefin in an amount corresponding to 1 to 5% by weight of the final polymer, in the preliminary activation. Unreacted α-olefin contained in the catalyst composition after the preliminary activation may be removed by vacuum distillation or like means, and further the solvent contained in the catalyst composition may be removed by filtration, distillation and drying to obtain a preliminarily activated catalyst in the form of dry powder, or the preliminarily activated catalyst may be employed as it is, in the form of slurry, without drying.

The three-component copolymerization of ethylene, propylene and a specified α-olefin, as a third step of the process of the present invention may be carried out either in the presence or absence of hydrogen. In the former case, it is possible to relatively reduce the molecular weight of the terpolymers of the present invention, by increasing the amount of hydrogen employed as in the case of propylene homopolymerization. The presence of a small amount of hydrogen also has an effectiveness of increasing the copolymerization rate.

The polymerization temperature is in the range of 40° to 70° C., preferably 45° to 65° C. The polymerization pressure has no limitation, but it may be in the range of the atmospheric pressure to 30 $Kg/cm^2$, preferably 5 to 25 $Kg/cm^2$. The polymerization time also has no limitation, but it may be in the range of 10 minutes to 10 hours, preferably 1 to 5 hours in the case of batch polymerization. Continuous polymerization also may be carried out. In this case the polymerization time, of course, has no limitation.

The proportion of composition of the terpolymers obtained according to the process of the present invention is determined by the proportion of propylene as a large amount component, an α-olefin of 4 to 12 carbon atoms as a small amount component and ethylene as another small amount component, fed inside the polymerization vessel, and the procedure of feeding them. Namely, the proportion of them fed and the feeding procedure should be maintained in a definite range and in a definite procedure during the polymerization time.

Propylene as a main and large amount component is maintained at a constant partial pressure or fed at a constant rate in the polymerization vessel during the polymerization time. Further the α-olefin of 4 to 12 carbon atoms as a small amount component is preferably mixed with propylene and ethylene in a definite proportion and continuously fed to the polymerization vessel. However, it may be also intermittently fed at a time interval to such an extent that it does not have any bad effect upon the composition or physical properties of the aimed terpolymers, for example, it may be intermittently fed at an interval of 10 minutes. The proportion of the α-olefin fed, based on propylene is made larger than that in the aimed terpolymers, based on propylene, since its polymerization rate is lower than that of propylene. Namely, in case where the α-olefin is butene-1, its proportion in the aimed polymer is as follows when calculated from the above-mentioned equation (1) in the item (4):

$$\text{Lower limit: } \frac{1}{96} \approx 0.010; \text{ upper limit: } \frac{10}{88} \approx 0.114$$

On the other hand, the proportion of butene-1 and propylene fed inside the polymerization vessel i.e. the ratio of their amounts was experimentally determined as follows:

$$\text{Lower limit: } \frac{2}{98} \approx 0.020; \text{ upper limit: } \frac{14}{86} \approx 0.163$$

Since ethylene as another small amount component is higher in the polymerization reaction rate than propylene, most of ethylene fed to the polymerization vessel of the present invention is immediately polymerized and constitutes a component of the terpolymers. Further, on the other hand, according to the process of the present invention, since ethylene (as well as propylene and butene-1) are scarcely lost in the form of soluble polymer other than the aimed polymer, ethylene may be fed in a proportion corresponding almost to its proportion in the aimed terpolymers. In the case of ethylene, its proportion in the aimed polymer, based on propylene is as follows:

$$\text{Lower limit: } \frac{1.0}{98} \approx 0.01; \text{ upper limit: } \frac{3.5}{88.0} \approx 0.04$$

The proportion of partial pressures of ethylene and propylene is not always necessary to maintain in the above-mentioned range, but it may be fed in the following manner, so that ethylene finally occupies 1 to 3.5% by weight of the total amount of ethylene, propylene and an α-olefin of 4 to 12 carbon atoms fed during the total polymerization step:

In view of the above-mentioned fact that the polymerization rate of ethylene is far higher than that of propylene, the feed of ethylene to the polymerization vessel in the process of the present invention may be carried out either continuously or intermittently. In the case of continuous feed, it is preferable to feed ethylene while mixing it with propylene and an α-olefin of 4 to 12 carbon atoms in a determined proportion. Further, as for an example of embodiment of intermittent feed, a predetermined amount of ethylene fed is divided into six equal portions, which are forced into the polymerization vessel at an interval of 30 minutes after initiation of the polymerization, each time for 5 minutes. In the case of continuous feed of ethylene, a terpolymer suitable for highly transparent films is obtained, while in the case of intermittent feed, a terpolymer suitable for molded products having a superior low-temperature punching strength is obtained.

The content of the copolymerized components in the terpolymers obtained according to the process of the present invention, i.e. the corrected total % (the value calculated from the below equation (1)) of ethylene and an α-olefin of 4 to 12 carbon atoms (which is expressed merely as α-olefin in the below equation (1)) is preferable to fall within the range of 3 to 5%.

$$\text{Ethylene \% } + A \cdot \alpha\text{-olefin \%} = 3.0 \text{ to } 5.0\% \qquad (1)$$

"A" in the above equation means a correction coefficient and is varied as follows depending on the number of carbon atoms of α-olefin:

$C_4^{--}$: 0.287,
$C_5^{--}$: 0.385,
$C_6^{--}$: 0.455,
$C_7^{--}$: 0.505,
$C_8^{--}$: 0.556,
$C_9^{--}$: 0.629,
$C_{10}^{--}$: 0.667,
$C_{11}^{--}$: 0.714, and
$C_{12}^{--}$: 0.769

(wherein $C_4^{--}$ means butene-1, $C_5^{--}$ means pentene-1, and the succeeding symbols have similar meanings).

The meaning of the above equation (1) consists in that the correction coefficient A was experimentally determined so that with respect of the effectiveness of contribution of the content of the copolymerized components in the terpolymers, to lowering of melting point, in case where the terpolymers are compared with polypropylene, the contribution of the α-olefin of 4 to 12 carbon atoms can also be regarded similar to that of ethylene %. The above-mentioned lowering of melting point improves the heat-sealability of film products made from the aimed terpolymers, but contrarily lowers the end-opening property and rigidity of the film products; hence if the above-mentioned corrected content of the copolymerized components is in the range of 3 to 5%, the most balanced values of various physical properties are obtained. Namely, if the content of the copolymerized components in the formula (1) is less than 3.0%, the heat-sealability of the film products is insufficient, and if it exceeds 5.0%, the end-opening property and rigidity are inferior; hence either one of the physical properties of the standards aimed in the present invention are deficient. Further, even in case where the content of the copolymerized components is in the range of 3 to 5%, if the ethylene content in the aimed terpolymers exceeds 3.5%, the amount of soluble polymer (n-hexane-soluble) increases. This results in not only the loss of monomers, but the following drawbacks:

reduction in the bulk density (BD) of formed terpolymer particles and operational troubles in producing the terpolymers such as adhesion of the terpolymers onto the inner wall of polymerization vessel, and the accompanying reduction in the heat-removing performance of the polymerization vessel.

As can be understood from the above description, the polymer composition of the terpolymers aimed in the process of the present invention should be such that (1)

the values of physical properties of film products made from the resulting terpolymers are balanced so as to accord with specified standards; (2) the amount of soluble polymer byproduced is very small in producing the terpolymers; and (3) operational troubles in producing the terpolymers are few. The above-mentioned specified standards refer to 0.9% or lower of transparency (haze), 150 Kg/mm or higher of Young's modulus and 135° C. or lower of heat-sealable temperature. Since the terpolymers obtained according to the process of the present invention ciontain only a small amount, e.g. 4% or less of soluble polymer, it is possible to obtain terpolymer products having superior physical properties, without separating the soluble polymer by extraction. Thus this process is very useful for reducing the raw material cost and simplifying the production process. However, the greatest effectiveness is that terpolymers having well-balanced physical properties can be produced with a good yield (terpolymer yield (g) per g of titanium trichloride composition (A)). This fact is beyond anticipation from the prior art.

The present invention will be further described by way of Examples and Comparative examples. In addition, the measurement of composition of terpolymers obtained in these Examples and the evaluation of their physical properties were carried out according to the following methods:

(a) Terpolymer composition:
$C_2^{--}$ % and α-olefin %, both according to infrared absorption spectra method.

(b) BD (bulk density g/ml):
Measured with terpolymers after dried.

(c) Melting point (°C.):
Measured according to DSC (differential scanning calorimeter) method.

(d) Haze (%):
Measured according to ASTM D 1003-52.

(e) $C_6$ extraction (%):
Value obtained by extraction with n-hexane for 4 hours by means of Soxhlet extractor.

(f) Heat-seal temperature (°C.):
Contact-bonded by means of a heat-sealer at a predetermined temperature under a load of 1 Kg/cm$^2$ for one second, and then subjected to T-peeling at a peel angle of 180° and at a rate of 200 mm/min. Sealing temperature refers to that at a strength of 0.50 Kg/15 mm.

(g) Punching strength:
According to ASTM D-781 (Kg-cm).

EXAMPLE 1

(1) Preparation of titanium trichloride composition:
0.4 Gram mol (hereinafter abbreviated to mol) of TiCl$_4$ was introduced into a 2 l glass reactor purged with nitrogen and heated and maintained at 35° C. To this TiCl$_4$ was dropwise added at 35° C. over 30 minutes a reaction liquid i.e. a reaction product (I) obtained by mixing together n-hexane (60 ml), diethylaluminum chloride (hereinafter abbreviated to DEAC) (0.05 mol) and diisoamyl ether (0.12 mol) at 25° C. for one minute, followed by reaction for 5 minutes (the molar ratio of diisoamyl ether/DEAC:2.4/1). The reaction mixture of TiCl$_4$ was then maintained at 35° C. for 30 minutes, followed by elevating the temperature to 75° C. and subjecting it to reaction for one hour at this temperature. The resulting reaction mixture formed a solid precipitate. The mixture was cooled down to room temperature (20° C.) and kept still standing to separate the supernatant liquid from the precipitate, followed by slanting the reactor to remove the supernatant liquid. n-Hexane (400 ml) was then added to the precipitate after removal of the supernatant liquid, followed by mixing with stirring for 10 minutes. Thereafter, operation of removing the supernatant liquid through decantation and slanting was repeated four times. The resulting precipitate after the treatment was subjected to vaporization to dryness in vacuo for removing coexistent n-hexane to obtain 19 g of a solid product (II). The total amount of this solid product (II) was then introduced into a 2 l glass reactor and 300 ml of n-hexane were added. The mixture was suspended with stirring, and 16 g of diisoamyl ether and 35 g of TiCl$_4$ were added at 20° C., followed by reaction at 65° C. for one hour. The resulting reaction mixture was cooled down to room temperature and kept still standing to separate precipitate (hereinafter referred to as second precipitate), followed by removing the supernatant liquid by slanting. n-Hexane (400 ml) was then added to the second precipitate after removal of the supernatant liquid, and they were mixed with stirring for 10 minutes. Thereafter, operation of removing the supernatant liquid by decantation was repeatation was repeated 4 times. The resulting solid product was then dried in vacuo to obtain 15 g of a titanium trichloride composition (A$_2$).

(2) Preparation of preliminarily activated catalyst:
Polypropylene powder (50 g), n-hexane (100 ml), DEAC (4.2 g) and the titanium trichloride composition (A$_2$) obtained above (0.3 g) were introduced into a 2 l capacity stainless steel reactor equipped with slant stirring blades and purged with nitrogen gas, and they were mixed together at room temperature for 5 minutes. The inside of the vessel was evacuated to remove n-hexane by vaporization. Thus the contents were brought into powder. Hydrogen (40 ml (NTP)) was then added to the vessel, and successively propylene was forced therein with stirring. While a partial pressure of 3 Kg/cm$^2$G was maintained, propylene was reacted in gas phase at 40° C. for 15 minutes to give 45 g of reacted propylene (150 g per g of titanium trichloride composition (A$_2$)). Thereafter, 0.39 g of a reaction product (D) obtained by reacting 0.23 g of triethylaluminum (hereinafter abbreviated to TEA) with 0.16 g of methyl p-toluylate (hereinafter abbreviated to MPT) in 200 ml of n-hexane at 35° C. for 30 minutes was poured into the above-mentioned mixture in the vessel, at room temperature together with the n-hexane, to obtain a preliminarily activated catalyst of the present invention (hereinafter referred to as catalyst No. 1).

(3) Copolymerization:
The total amount of the above-mentioned catalyst No. 1 was fed into a 50 l capacity stainless steel polymerization vessel equipped with paddle type stirring blades and purged with nitrogen gas, and 8.5 Nl of hydrogen was then fed. Further a gas mixture of propylene/butene-1 (ratio by weight=9:1) (at 55° C.) was fed till the inner pressure of the vessel reached 18 Kg/cm$^2$G. The inner temperature of the vessel was elevated up to 60° C. by heating. A gas mixture of $C_2^{--}/C_3^{--}/C_4^{--}$ (ratio by weight: 2.5/93/4.5) (wherein $C_2^{--}$ represents ethylene, $C_3^{--}$, propylene and $C_4^{--}$, butene-1) (at 55° C.) was fed and the inner pressure of the vessel was maintained at 18 Kg/cm$^2$G. Gas phase copolymerization reaction was carried out continuously feeding the gas mixture for 3 hours. The feed of the gas mixture was then stopped and unreacted gas mixture in the vessel was purged till the inner pressure reached 0 Kg/cm$^2$G to substantially complete the copolymerization reaction. Propylene oxide (10 g) was fed to the vessel to carry out killing reaction for the catalyst at 60° C. for 15 minutes. The inner temperature of the vessel was then elevated up to 75° C. by heating, and 1200 Nl of nitrogen gas under the atmospheric pressure were passed inside the vessel for one hour to dry the contents of the vessel. The vessel was cooled till the inner temperature of the vessel reached room temperature, and the resulting polymer was taken out. Yield: 3,152 g. The above-mentioned preliminary activation conditions, polymerization conditions and composition or physical properties of the resulting terpolymer thus obtained, etc. are shown in Table 1.

EXAMPLE 2

(1) Preparation of titanium trichloride composition:

TiCl$_4$ (0.64 mol) and toluene (50 ml) were introduced into a 2 l glass reactor purged with nitrogen gas and the temperature was maintained at 45° C. by heating. A reaction liquid i.e. a reaction product (I) obtained by mixing together n-heptane (80 ml), di-n-butylaluminum chloride (hereinafter abbreviated to DBAC) (0.16 mol) and di-n-butyl ether (0.30 mol) at 30° C. for 3 minutes, followed by further reaction for 20 minutes (ratio by mol of di-n-butyl ether/DBAC:1.87/1) was dropwise added to the TiCl$_4$ solution obtained above, at 45° C. over 60 minutes.

The temperature of the resulting reaction mixture was then elevated up to 85° C., followed by reaction for 2 hours at this temperature. The reaction mixture yielded a solid precipitate. The mixture was cooled down to room temperature (20° C.), followed by still standing, to allow the supernatant liquid to separate from the precipitate. The supernatant liquid was removed by slanting. n-Heptane (300 ml) was added to the precipitate after the removal of the supernatant liquid, followed by mixing with stirring for 10 minutes. Thereafter, operation of removing the supernatant liquid through decantation and slanting was repeated twice. Coexistent n-heptane was removed by vaporization to dryness under reduced pressure to obtain 49 g of a solid product (II). The total amount of this solid product (II) was introduced into a 2 l stainless steel reactor, and 300 ml of n-heptane was added to suspend the product with stirring. Di-n-butyl ether (20 g) and TiCl$_4$ (150 g) were added at 20° C., followed by reaction at 90° C. for 2 hours. The resulting reaction mixture was cooled down to room temperature and kept still standing to allow the second precipitate to separate from the supernatant liquid, which was then removed by slanting. n-Heptane (300 ml) was added to the second precipitate after removal of the liquid, followed by mixing with stirring for 10 minutes. Operation of removing the supernatant liquid through decantation and slanting was repeated 3 times. The resulting solid product was dried under reduced pressure to obtain 40 g of a titanium trichloride composition (A$_2$).

(2) Preparation of preliminarily activated catalyst:

Into a 2 l capacity stainless steel reactor equipped with slant stirring blades and purged with nitrogen gas were introduced polypropylene powder (50 g), n-pentane (40 ml), DEAC (1.6 g) and the above-mentioned titanium trichloride composition (A$_2$) (0.32 g), followed by removing n-pentane by treatment under reduced pressure. 25 Nml of hydrogen was then added at 30° C. and propylene was forced into the vessel. While a propylene partial pressure of 1.5 Kg/cm$^2$G was maintained and the contents were fluidized with propylene gas, reaction of propylene was carried out for 45 minutes to give 33.6 g of reacted propylene (105 g per g of titanium trichloride composition (A$_2$)). Thereafter, 0.71 g of a reaction product (D) obtained by reacting 0.3 g of triethylaluminum (hereinafter abbreviated to TEA) with 0.41 g of ethyl benzoate (hereinafter abbreviated to EBz) in 100 ml of n-pentane at 20° C. for 10 minutes, was poured into the above-mentioned mixture in the vessel, at room temperature together with the n-pentane, to obtain a preliminarily activated catalyst of the present invention (hereinafter referred to as catalyst No. 2).

(3) Copolymerization:

Copolymerization of a three-component system consisting of ethylene, propylene and butene-1 was carried out in the same manner as in Example 1 (3), except that the catalyst No. 2 was employed. Yield: 2,950 g. Preliminary activation conditions, polymerization conditions and results are shown in Table 1.

EXAMPLE 3

(1) Preparation of titanium trichloride composition:

Titanium trichloride composition (A$_2$) obtained in Example 2 was employed.

(2) Preparation of preliminarily activated catalyst:

Polypropylene powder (30 g), the above-mentioned titanium trichloride composition (A$_2$) (0.40 g), di-n-butylaluminum monochloride (1.2 g) (hereinafter abbreviated to n-Bu$_2$AlCl) and hydrogen (15 Nml) were added to a reactor prepared as in Example 2 (2), and propylene was forced therein. Reaction was carried out at 40° C. under a total pressure of 1.5 Kg/cm$^2$G for 30 minutes, followed by discharging unreacted propylene. The amount of propylene reacted was 60 g (150 g/g of titanium trichloride composition (A$_2$)). Into the vessel after the discharge was poured at room temperature a reaction product (D) obtained by reacting 0.54 g of triisobutylaluminum (hereinafter abbreviated to TiBA) wiht 0.30 g of ethyl benzoate (hereinafter abbreviated to $\phi$COOEt) in 180 ml of n-hexane at 30° C. for 30 minutes, to obtain a preliminarily activated catalyst (hereinafter abbreviated to catalyst No. 3).

(3) Copolymerization:

Gas phase copolymerization of a three-component system consisting of ethylene, propylene and butene-1 was carried out in the same manner as in Example 1 (3) except that the catalyst No. 3 was employed. Yield: 3,680 g. Preliminary activation conditions, copolymeriztion conditions and results are shown in Table 1.

EXAMPLE 4

(1) Preparation of titanium trichloride composition:

This was carried out in the same manner as in Example 1 (1).

(2) Preparation of preliminarily activated catalyst:

This was carried out in the same manner as in Example 1 except that a reaction product (D) obtained by reacting 0.22 g in place of 0.23 g, of TEA with 0.36 g of ethyl p-anisate in place of methyl toluylate, in Example 1 (2) was employed; to obtain a preliminarily activated catalyst (No. 4) of the present invention.

(3) Copolymerization:

Gas phase copolymerization of a three-component system consisting of ethylene, propylene and butene-1 was carried out in the same manner as in Example 1 (3), Yield: 2,870 g. Preliminary activation conditions, copolymerization conditions and results are shown in Table 1.

COMPARATIVE EXAMPLE 1

Employing a combination of titanium trichloride composition (A₂) with DEAC obtained in the same manner as in Example 1 (1), a gas phase copolymerization was carried out in the same manner as in Example 1 (3), but without preliminary activation of Example 1 (2). As a result, 0.5 hour after initiation of the copolymerization, the contents (terpolymer) became a mass and it was impossible to continue copolymerization.

obtained without preliminary activation in Examples 1 and 2 to carry out at least the gas phase copolymerization of three-component system of the present invention.

EXAMPLES 5~7

Example 1 was repeated except that the preliminary activation time (15 minutes) in Example 1 (2) was varied (12 minutes in Example 5, 30 minutes in Example 6 and 45 minutes in Example 7). The yields of terpolymers were 3,110 g, 3,230 g and 3,140 g, respectively. Preliminary activation conditions, polymerization conditions and results are shown in Table 2.

TABLE 1

(Comparative examples 1 and 2, unlisted)

| Preliminary activation conditions, polymerization conditions and results | Examples 1 | 2 | 3 | 4 |
|---|---|---|---|---|
| Preliminary activation conditions | | | | |
| (A) Titanium trichloride composition (g) | 0.30 | 0.32 | 0.40 | 0.30 |
| (B) AlR$_1$R$_2$X (g) | DEAC 4.2 | DEAC 1.6 | DEAC 1.2 | DEAC 4.2 |
| (C) α-olefin (g/(A) g) | 150 | 105 | 150 | 150 |
| Reaction conditions of (C), Kg/cm²G, °C., min. | 3, 40, 15 | 1.5, 30, 45 | 1.5, 40, 30 | 3, 40, 45 |
| (D$_1$) Trialkylaluminum (g) | TEA 0.23 | TEA 0.30 | TiBA 0.54 | TEA 0.23 |
| (D$_2$) Aromatic ester (g) | MPT 0.16 | EBZ 0.41 | EBZ 0.30 | PEAN 0.36 |
| Reaction conditions of (D$_1$)/(D$_2$), °C., min. | 35, 30 | 20, 10 | 30, 30 | 35, 30 |
| Adding manner of (D) to (A + B + C) | after reaction of (A + B + C) | same as left | same as left | same as left |
| Polymerization conditions | | | | |
| Temperature, °C. | 60 | 60 | 60 | 60 |
| Pressure, Kg/cm²G | 18 | 18 | 18 | 18 |
| Ratio by wt. of α-olefin/C$_3$= initially fed | 1/9 | 1/9 | 1/9 | 1/9 |
| Kind of α-olefin | C$_4$= | C$_4$= | C$_4$= | C$_4$= |
| Ratio by wt. of C$_2$=/C$_3$=α-olefin | 2.5/93/4.5 | 2.5/93/4.5 | 2.5/93/4.5 | 2.5/93/4.5 |
| Polymerization results | | | | |
| Terpolymer yield (g) | 3,152 | 2,950 | 3,680 | 2,870 |
| Yield as terpolymer g/(A) g | 10,507 | 9,219 | 9,200 | 9,580 |
| (Polymer g/terpolymer g) %, in preliminary activation | 1.4 | 1.2 | 1.6 | 1.6 |
| Adhesion of terpolymer onto inner wall of polymerization vessel | None | same as left | same as left | same as left |
| Composition of polymer | | | | |
| C$_2$= % | 2.6 | 2.5 | 2.5 | 2.7 |
| α-olefin % | 4.3 | 4.5 | 4.4 | 4.4 |
| C$_6$ extract % | 2.5 | 2.3 | 2.8 | 3.1 |
| Physical properties of polymer | | | | |
| MTR | | | | |
| MFR | 8.8 | 9.1 | 8.2 | |
| BD | 0.49 | 0.50 | 0.50 | 0.49 |
| MP (°C.) according to DSC | 143 | 144 | 143 | 142 |
| Haze (%) | 0.6 | 0.7 | 0.6 | 0.6 |
| Young's modulus (Kg/mm) | 155 | 155 | 155 | 155 |
| Heat seal temperature (°C.) | 132 | 132 | 132 | 131 |
| Content of copolymerized components (%)*[1] | 3.8 | 3.8 | 3.8 | 4.0 |

*[1]Content of copolymerized components other than propylene (calculated as ethylene), see equation (1). This applies to the succeeding Tables.

COMPARATIVE EXAMPLE 2

Employing a combination of titanium trichloride composition (A₂) with DBAC obtained in the same manner as in Example 2 (1), gas phase copolymerization of the three-component system was carried out in the same manner as in Example 2 (3), but without preliminary activation of Example 2 (2). As a result, 0.4 hour after initiation of the polymerization, the contents (terpolymer) became a mass, and it was impossible to continue copolymerization.

As is apparent from the above-mentioned Comparative examples 1 and 2, it is impossible with catalysts

COMPARATIVE EXAMPLES 3 AND 4

Example 1 was repeated except that the time for the preliminary activation of catalyst (15 minutes) in Example 1 (2) was varied (4 minutes in Comparative example 3 and 70 minutes in Comparative example 4). The yields of terpolymers were 3,060 g and 3,310 g, respectively. The preliminary activation conditions, polymerization conditions and results are shown in Table 2.

As is apparent from the results of Table 2, the preliminary activation time has a suitable range. Namely, if the proportion of the amount of polymer (polypropylene)

formed during the preliminary activation, to the total polymer yield after polymerization is too large, heat-seal temperature, haze, etc. among the physical properties of the resulting polymer become inferior. On the contrary, if it is too small, polymer adheres to the inner wall of the polymerization vessel during the polymerization.

COMPARATIVE EXAMPLES 5 AND 6

Examples 1 and 2 were repeated except that the additive in the preliminary activation of catalyst of Example 1 (2) or Example 2 (2), i.e. the reaction product (D) of TEA with MPT or that of TEA with EBz was not added. The yields of terpolymers were 2,580 g and 2,670 g, respectively. The preliminary activation conditions, polymerization conditions and results are shown in Table 2.

As is apparent from the results of Table 2, in case where the reaction product (D) of TEA with MPT or TEA with EBz is not added to catalyst in the preliminary activation, the following drawbacks occur as compared with Examples 1 to 7:

(i) Polymer adheres to the inner wall of the polymerization vessel. As a result, a long term operation is impossible.

(ii) Polymerization activity (terpolymer yield per unit time) is low.

(iii) Amount of $C_6$ extract (soluble terpolymer) is large.

(iv) Young's modulus is low.

Thus, the results of these Comparative examples are inferior to those of Examples 1~7, both with respect of polymerization process and with respect of the physical properties of terpolymers.

TABLE 2

| Preliminary activation conditions, polymerization conditions and results | Example | | | Comparative example | | | |
|---|---|---|---|---|---|---|---|
| | 5 | 6 | 7 | 3 | 4 | 5 | 6 |
| Preliminary activation conditions | | | | | | | |
| (A) Titanium trichloride composition (g) | 0.31 | 0.29 | 0.33 | 0.30 | 0.31 | 0.39 | 0.43 |
| (B) $AlR_1R_2X$ (g) | DEAC 4.2 | same as left | same as left | same as left | same as left | same as left | 1.6 |
| (C) α-Olefin (g/(A) g) | 120 | 295 | 450 | 45 | 670 | 160 | 105 |
| Reaction conditions of (C), $Kg/cm^2$, °C., min. | 3.40.12 | 3.40.30 | 3.40.45 | 3.40.4 | 3.40.70 | 3.40.15 | 1.5.30.45 |
| ($D_1$) Trialkylaluminum (g) | TEA 0.23 | same as left | same as left | same as left | same as left | none | same as left |
| ($D_2$) Aromatic ester (g) | MPT 0.16 | same as left | same as left | same as left | same as left | none | same as left |
| Reaction conditions of ($D_1$)/($D_2$), °C., min. | 35.30 | same as left | same as left | same as left | same as left | — | — |
| Adding manner of (D) to (A + B + C) | after reaction of (A + B + C) | same as left | same as left | same as left | same as left | — | — |
| Polymerization conditions | | | | | | | |
| Temperature (°C.) | 60 | same as left | same as left | same as left | same as left | same as left | same as left |
| Pressure ($Kg/cm^2$) | 18 | same as left | same as left | same as left | same as left | same as left | same as left |
| Ratio by wt. of α-olefin/$C_3^=$ initially fed | 1/9 | same as left | same as left | same as left | same as left | same as left | same as left |
| Kind of α-olefin | $C_4^=$ | same as left | same as left | same as left | same as left | same as left | same as left |
| Ratio by wt. of $C_2^=/C_3^=/$α-olefin | 2.5/93/4.5 | same as left | same as left | same as left | same as left | same as left | same as left |
| Polymerization results | | | | | | | |
| Terpolymer yield (g) | 3,110 | 3,230 | 3,140 | 3,060 | 3,310 | 2,580 | 2,670 |
| Yield as terpolymer g/(A) g | 10,030 | 11,140 | 9,520 | 10,200 | 10,680 | 6,615 | 6,120 |
| (Polymer g/terpolymer g) %, in preliminary activation | 1.2 | 2.6 | 4.7 | 0.4 | 6.3 | 2.4 | 2.5 |
| Adhesion of terpolymer onto inner wall of polymerization vessel | none | same as left | same as left | Yes (few) | none | Yes (few) | Yes (few) |
| Composition of polymer | | | | | | | |
| $C_2^=$ (%) | 2.5 | 2.4 | 2.3 | 2.4 | 2.3 | 2.5 | 2.6 |
| α-olefin (%) | 4.4 | 4.6 | 4.6 | 4.3 | 4.5 | 4.5 | 4.4 |
| $C_6$ extracts (%) | 3.2 | 2.4 | 2.3 | 3.8 | 2.3 | 4.7 | 5.3 |
| Physical properties of polymer | | | | | | | |
| MFR | 8.7 | 9.5 | 8.4 | 9.6 | 8.1 | 9.4 | 9.9 |
| BD | 0.48 | 0.51 | 0.51 | 0.45 | 0.51 | 0.48 | 0.47 |
| MP according to DSC (°C.) | 143 | 143 | 145 | 144 | 146 | 143 | 142 |
| Haze (%) | 0.7 | 0.7 | 0.8 | 0.8 | 1.0 | 0.8 | 0.9 |
| Young's modulus (Kg/mm) | 155 | 155 | 155 | 150 | 155 | 145 | 145 |
| Heat seal temperature (°C.) | 132 | 133 | 134 | 133 | 136 | 133 | 132 |
| Content of copolymerized components*[1] | 3.8 | 3.7 | 3.6 | 3.6 | 3.6 | 3.8 | 3.9 |

EXAMPLES 8, 9 AND 10

Example 1 was repeated except that the amount of propylene reacted, in the preliminary activation of catalyst of Example 1 (2), and/or the proportion of ethylene, propylene and butene-1 employed in the copolymerization of Example 1 (3) were varied. The yields of terpolymers were 3,160 g, 3,090 g and 3,120 g, respectively. The preliminary activation conditions, polymerization conditions and results are shown in Table 3.

COMPARATIVE EXAMPLES 7 AND 8

Example 1 was repeated except that the amount of propylene reacted in the preliminary activation of catalyst of Example 1 (2) was increased to render it same as those in the case of Examples 8~10. Further, Example 1 was repeated except that the proportion of ethylene, propylene and butene-1 employed in the copolymerization of Example 1 (3) was varied so that $C_2^{--}$ % or $C_4^{--}$ % in the terpolymers obtained by the copolymerization fell outside the range of the present invention. The yields of terpolymers were 3,200 g and 3,180 g, respectively. The preliminary activation conditions, polymerization conditions and results are shown in Table 3.

As is apparent from the results of Table 3, in case where the feed proportion of ethylene or butene-1 employed in the copolymerization is varied, (i) if the ethylene content in the resulting terpolymer is lower than those in the range of the present invention, the punching impact strength of molded products produced from the terpolymer becomes higher; hence such lower content is undesirable, and (ii) if the ethylene content is higher than those in the range of the present invention, $C_6$ extract (%) increases, resulting in the loss of aimed polymer. At the same time, Young's modulus of molded products is reduced. Further, in this case, a portion of terpolymer adheres onto the inner wall of the polymerization vessel, resulting in an obstacle to operation of the vessel; hence such case is also undesirable.

TABLE 3

| Preliminary activation conditions, polymerization conditions and results | Example 8 | Example 9 | Example 10 | Comparative example 7 | Comparative example 8 |
|---|---|---|---|---|---|
| Preliminary activation conditions | | | | | |
| (A) Titanium trichloride composition (g) | 0.33 | 0.31 | 0.32 | 0.31 | 0.30 |
| (B) AlR$_1$R$_2$X (g) | DEAC 4.2 | same as left | same as left | same as left | same as left |
| (C) α-olefin (g/(A) g) | 240 | same as left | same as left | same as left | same as left |
| Reaction conditions of (C), Kg/cm$^2$, °C., min. | 3.40.25 | same as left | same as left | same as left | same as left |
| (D$_1$) Trialkylaluminum (g) | TEA 0.23 | same as left | same as left | same as left | same as left |
| (D$_2$) Aromatic ester (g) | MPT 0.16 | same as left | same as left | same as left | same as left |
| Reaction conditions of (D$_1$)/(D$_2$), °C., min. | 35.30 | same as left | same as left | same as left | same as left |
| Adding manner of (D) to (A + B + C) | after reaction of (A + B + C) | same as left | same as left | same as left | same as left |
| Polymerization conditions | | | | | |
| Temperature (°C.) | 60 | same as left | same as left | same as left | same as left |
| Pressure (Kg/cm$^2$) | 18 | same as left | same as left | same as left | same as left |
| Ratio bt wt. of α-olefin/C$_3$= initially fed | 0.14/0.86 | 1/9 | 3/97 | 16/84 | 0/100 |
| Kind of α-olefin | C$_4$= | same as left | same as left | same as left | none |
| Ratio by wt. of C$_2$=/C$_3$=/α-olefin | 1.3/88.7/10.0 | 2.5/93/4.5/2.0 | 3.5/94.5/2.0 | 0.5/86.5/13.0 | 3.9/96.1/none |
| Polymerization results | | | | | |
| Terpolymer yield (g) | 3,160 | 3,090 | 3,120 | 3,200 | 3,180 |
| Yield as terpolymer g/(A) g | 9,580 | 9,970 | 9,750 | 10,320 | 10,600 |
| (Polymer g/terpolymer g) %, in preliminary activation | 2.5 | 2.4 | 2.5 | 2.3 | 2.3 |
| Adhesion of terpolymer onto inner wall of polymerization vessel | none | same as left | same as left | same as left | Yes (few) |
| Composition of polymer | | | | | |
| C$_2$= (%) | 1.2 | 2.5 | 3.3 | 0.5 | 3.9 |
| α-olefin (%) | 9.8 | 4.7 | 2.0 | 12.5 | 0.0 |
| C$_6$ extracts (%) | 2.2 | 2.6 | 3.5 | 2.4 | 5.9 |
| Physical properties of polymer | | | | | |
| MFR | 9.5 | 8.8 | 8.7 | 9.6 | 8.5 |
| BD | 0.50 | 0.51 | 0.49 | 0.51 | 0.46 |
| MP according to DSC (°C.) | 143 | 143 | 142 | 142 | 143 |
| Haze (%) | 0.8 | 0.7 | 0.8 | 0.7 | 1.1 |
| Young's modulus (Kg/mm) | 155 | 155 | 150 | 155 | 140 |
| Heat seal temperature (°C.) | 132 | 133 | 132 | 132 | 133 |
| Content of copolymerized components[*1] | 3.9 | 3.8 | 3.9 | 4.1 | 3.9 |
| Punching-resistant impact temperature (°C.) | 5 | 0.0 | −2.0 | 11.0 | −3.0 |

EXAMPLES 11 AND 12

Example 1 was repeated except that the proportion of $(C_2^{--}/C_3^{--}/C_4^{--})$ fed under definite pressure in the copolymerization of three-component system of Example 1 (3) was varied in the range of those of the present invention. The yields of terpolymers were 3,250 g and 3,110 g, respectively. The preliminary activation conditions, polymerization conditions and results are shown in Table 4.

COMPARATIVE EXAMPLES 9 AND 10

Example 1 was repeated except that the proportion of $(C_4^{--}/C_3^{--})$ initially fed in Example 1 (3) and the proportion of $(C_2^{--}/C_3^{--}/C_4^{--})$ fed under definite pressure in the subsequent copolymerization of three-component system were varied so that the proportion of $C_2^{--}$ or $C_4^{--}$ in the resulting terpolymer fell outside the range of those of the present invention. The yields of terpolymer were 3,140 g and 3,090 g, respectively.

The preliminary activation conditions, polymerization conditions and results are shown in Table 4.

In the respective cases of Examples 11 and 12 and Comparative examples 9 and 10, the values of "$C_2^{--}$ % + 0.287 $(C_4^{--})$ %" of the above-mentioned item (7) calculated from $C_2^{--}$ and $C_4^{--}$ % in the respective terpolymers obtained, are 3.3, 4.7, 2.9 and 5.1, respectively. Thus, the values of Comparative examples 9 and 10 fall outside the range where adequate physical properties are obtained. As a result, in the case of Comparative example 9, the reduction in the heat seal temperature is insufficient, and in the case of Comparative example 10 where the calculated value exceeded 5.00, the heat seal temperature is low, but Young's modulus is reduced; hence the results of Comparative example 10 are insufficient. Besides, in the case of Comparative example 10, $C_6$ extract % is somewhat high, and terpolymer adheres onto the inner wall of the polymerization vessel.

TABLE 4

| Preliminary activation conditions, polymerization conditions and results | Example 11 | Example 12 | Comparative example 9 | Comparative example 10 |
|---|---|---|---|---|
| Preliminary activation conditions | | | | |
| (A) Titanium trichloride composition (g) | 0.35 | 0.32 | 0.33 | 0.31 |
| (B) AlR$_1$R$_2$X (g) | DEAC 4.2 | same as left | same as left | same as left |
| (C) α-olefin (g/(A) g) | 240 | same as left | same as left | same as left |
| Reaction conditions of (C), Kg/cm$^2$, °C., min. | 3.40.25 | same as left | same as left | same as left |
| (D$_1$) Trialkylaluminum (g) | TEA 0.23 | same as left | same as left | same as left |
| (D$_2$) Aromatic ester (g) | MPT 0.16 | same as left | same as left | same as left |
| Reaction conditions of (D$_1$)/(D$_2$), °C., min. | 35.30 | same as left | same as left | same as left |
| Adding manner of (D) to (A + B + C) | after reaction of (A + B + C) | same as left | same as left | same as left |
| Polymerization conditions | | | | |
| Temperature (°C.) | 60 | same as left | same as left | same as left |
| Pressure (Kg/cm$^2$) | 18 | same as left | same as left | same as left |
| Ratio by wt. of α-olefin/C$_3$= initially fed | 1/9 | same as left | 8/92 | 13/87 |
| Kind of α-olefin | C$_4$= | same as left | same as left | same as left |
| Ratio by wt. of C$_2$=/C$_3$=/α-olefin | 2.0/93.5/4.5 | 3.4/91.6/5.0 | 1.9/94.6/3.5 | 3.3/89.7/7.0 |
| Polymerization results | | | | |
| Terpolymer yield (g) | 3,250 | 3,110 | 3,140 | 3,090 |
| Yield as terpolymer g/(A) g | 9,290 | 9,720 | 9,515 | 9,970 |
| (Polymer g/terpolymer g) %, in preliminary activation | 2.6 | 2.5 | 2.5 | 2.4 |
| Adhesion of terpolymer onto inner wall of polymerization vessel | none | same as left | same as left | Yes (few) |
| Composition of polymer | | | | |
| C$_2$= (%) | 2.0 | 3.3 | 1.9 | 3.2 |
| α-olefin (%) | 4.5 | 5.0 | 3.5 | 6.5 |
| C$_6$ extracts (%) | 2.4 | 4.0 | 2.0 | 4.9 |
| Physical properties of polymer | | | | |
| MFR | 8.7 | 8.2 | 8.1 | 7.9 |
| BD | 0.51 | 0.48 | 0.51 | 0.45 |
| MP according to DSC (°C.) | 146 | 138 | 148 | 136 |
| Haze (%) | 0.7 | 0.8 | 0.9 | 1.0 |
| Young's modulus (Kg/mm) | 160 | 150 | 160 | 145 |
| Heat seal temperature (°C.) | 135 | 130 | 137 | 129 |
| Content of copolymerized components[*1] | 3.3 | 4.7 | 2.9 | 5.1 |
| Punching-resistant impact temperature (°C.) | 1.0 | −2.0 | 3.0 | −3.0 |

EXAMPLES 13, 14 AND 15

Example 1 was repeated except that pentene-1, hexene-1 or octene-1 was employed as α-olefin initially fed as well as fed under definite pressure in the copolymerization of Example 1 (3). The yields of terpolymer were 2,980 g, 3,080 g and 3,010 g, respectively. Preliminary activation conditions, polymerization conditions and results are shown in Table 5.

COMPARATIVE EXAMPLE 11

Example 1 was repeated except that the polymerization temperature in the copolymerization of Example 1 (3) was changed to 70° C. The yield of terpolymer was 3,310 g. The preliminary activation conditions, polymerization conditions and results are shown in Table 5.

As is apparent from the results of Table 5, in the case of the resulting terpolymer, the heat seal temperature is suitable, but $C_6$ extract % is high, Young's modulus is low (140 Kg/mm), and besides, polymer adheres onto the inner wall of polymerization vessel during polymerization. As a result, gas phase polymerization at 70° C. cannot afford desirable results.

COMPARATIVE EXAMPLE 12

(1) Preparation of titanium trichloride composition:

Into a 2 l reactor equipped with slant stirring blades and purged with nitrogen gas were fed a hydrogenated and oxygen-free gasoline fraction (boiling point: 140°~165° C.) (220 ml) and $TiCl_4$ (110 ml), and further a solution obtained by adding aluminum ethyl sesquichloride (222.2 g) to the gasoline fraction (666 ml), was dropwise added at 0° C. with stirring at a stirring rate of 250 rpm over 6 hours, to obtain red-brown solid fine particles. Thereafter stirring was continued for 2 hours at 0° C., for 12 hours at room temperature and further for 4 hours at 60° C. to obtain a reduction solid product. Liquid phase was removed by decantation and 800 ml of fresh gasoline were added. Stirring and decantation were carried out twice, and finally 500 ml of gasoline were added. Thereafter, 180 ml of di-n-butyl ether were dropwise added with stirring at 65° C. over 20 minutes, and further, after one hour, 7.8 ml of cycloheptatriene-1,3,5 were added, followed by continuous stirring at 70° C. for 4 hours. After cooling, the liquid phase was removed by decantation, followed by washing three times with 500 ml of gasoline and drying to obtain 115 g of an ether-treated, reduction solid product.

(2) Preparation of preliminarily activated catalyst:

Into a 2 l capacity stainless steel reactor equipped with slant stirring blades and purged with nitrogen gas was introduced a suspension consisting of 0.69 g of the ether-treated, reduction solid product obtained above in the item (1), and 2.25 mmol of cycloheptatriene-1,3,5 dissolved in 8 ml of hexane. DEAC (4.2 g) was added to the suspension and then polypropylene (50 g) was added, followed by removing n-hexane under reduced pressure to obtain powder. Hydrogen (40 ml) was added, and gas phase reaction was carried out under a propylene partial pressure of 3 $Kg/cm^2G$, at 40° C. for 15 minutes to obtain a preliminarily activated catalyst.

(3) Copolymerization:

Example 1 was repeated except that the preliminarily activated catalyst obtained above in the item (2) was employed. Preliminary activation conditions, polymerization conditions and results are shown in Table 5.

Comparison of Comparative example 12 in this Table 5 with Example 1 in Table 1 shows that the former is lower in the yield and more in the amount of $C_6$ extract than the latter. Further, with respect of the physical properties, the Young's modulus is also insufficient. Thus, even if the ether-treated, reduction solid product was substituted for the titanium trichloride composition ($A_2$) of the present invention, no desirable results can be obtained.

TABLE 5

| Preliminary activation conditions, polymerization conditions and results | Example 13 | Example 14 | Example 15 | Comparative example 11 | Comparative example 12 |
|---|---|---|---|---|---|
| Preliminary activation conditions | | | | | |
| (A) Titanium trichloride composition (g) | 0.29 | 0.32 | 0.31 | 0.25 | 0.69*6 |
| (B) $AlR_1R_2X$ (g) | DEAC 1.2 | same as left | same as left | DEAC 4.2 | DEAC 4.2 |
| (C) α-olefin (g/(A) g) | 150 | same as left | same as left | 240 | 80 |
| Reaction conditions of (C), $Kg/cm^2$, °C., min. | 30.40.15 | same as left | same as left | 30.40.25 | 3.40.15 |
| ($D_1$) Trialkylaluminum (g) | TiBA 0.54 | same as left | same as left | TEA 0.23 | none |
| ($D_2$) Aromatic ester (g) | EBZ 0.30 | same as left | same as left | MPT 0.16 | none |
| Reaction conditions of ($D_1$)/($D_2$), °C., min. | 35.30 | same as left | same as left | same as left | none |
| Adding manner of (D) to (A + B + C) | after reaction of (A + B + C) | same as left | same as left | same as left | none |
| Polymerization conditions | | | | | |
| Temperature (°C.) | 60 | same as left | same as left | 70 | 60 |
| Pressure ($Kg/cm^2$) | 18 | same as left | same as left | same as left | same as left |
| Ratio by wt. of α-olefin/$C_3^=$ initially fed | 1/9 | same as left | same as left | same as left | same as left |
| Kind of α-olefin | $C_5^=$ | $C_6^=$ | $C_8^=$ | $C_4^=$ | $C_4^=$ |
| Ratio by wt. of $C_2^=$/$C_3^=$/α-olefin | 2.5/94.5/3.0 | 2.5/95.0/2.5 | 2.5/95.5/2.0 | 2.5/93/4.5 | 2.5/93/4.5 |
| Polymerization results | | | | | |
| Terpolymer yield (g) | 2,980 | 3,080 | 3,010 | 3,310 | 4,520 |

TABLE 5-continued

| Preliminary activation conditions, polymerization conditions and results | Example 13 | Example 14 | Example 15 | Comparative example 11 | Comparative example 12 |
|---|---|---|---|---|---|
| Yield as terpolymer g/(A) g | 10,380 | 9,470 | 9,710 | 13,240 | 6,550 |
| (Polymer g/terpolymer g) %, in preliminary activation | 1.5 | 1.6 | 1.5 | 1.8 | 1.2 |
| Adhesion of terpolymer onto inner wall of polymerization vessel | none | same as left | same as left | Yes (much) | Yes (few) |
| Composition of polymer | | | | | |
| $C_2^=$ (%) | 2.5 | 2.7 | 2.6 | 2.6 | 2.5 |
| α-olefin (%) | 2.8 | 2.3 | 1.7 | 4.3 | 4.4 |
| $C_6$ extracts (%) | 2.9 | 3.1 | 3.2 | 7.3 | 5.0 |
| Physical properties of polymer | | | | | |
| MFR | 9.4 | 9.7 | 9.6 | 9.7 | 8.4 |
| BD | 0.50 | 0.49 | 0.49 | 0.40 | 0.47 |
| MP according to DSC (°C.) | 144 | 144 | 144 | 144 | 143 |
| Haze (%) | 0.7 | 0.8 | 0.6 | 0.8 | 0.8 |
| Young's modulus (Kg/mm) | 155 | 155 | 155 | 135 | 145 |
| Heat seal temperature (°C.) | 133 | 133 | 133 | 132 | 133 |
| Content of copolymerized components[*1] | 3.6 | 3.7 | 3.6 | 3.8 | 3.8 |

[*6]Ether-treated, reduction solid product

EXAMPLE 16

(1) Preparation of titanium trichloride composition: Example 1 (1) was repeated.

(2) Preparation of preliminarily activated catalyst:

Preliminary activation of Example 1 was repeated except that the reaction product (D) of TEA with MPT was added in advance of carrying out reaction with propylene.

(3) Copolymerization:

Example 1 (3) was repeated.

Preliminary activation conditions, polymerization conditions and results are shown in Table 6.

COMPARATIVE EXAMPLE 13

(1) Preparation of titanium trichloride composition: Example 1 (1) was repeated.

(2) Preparation of preliminarily activated catalyst:

Example 1 was repeated except that the addition of the reaction product (D) of TEA with MPT was omitted in the preliminary activation of the item (1).

(3) Copolymerization:

Into a 50 l capacity stainless steel polymerization vessel equipped with paddle type stirring blades and purged with nitrogen gas were fed the total amount of the catalyst obtained above in the item (2) and then 8.5 Nl of hydrogen, followed by feeding a gas mixture (propylene/butene; ratio by weight: 9:1) (at 55° C.) to the vessel till the inner pressure of the vessel reached 18 Kg/cm²G. Thereafter a reaction product (D) obtained by reacting 0.23 g of TEA with 0.16 g of MPT in 200 ml of n-hexane at 35° C. for 30 minutes was forced into the polymerization vessel with the above-mentioned gas mixture together with the n-hexane. Further the temperature inside the polymerization vessel was elevated up to 60° C. by heating, a gas mixture ($C_2^{--}/C_3^{--}/C_4^{--}$, ratio by weight: 2.5/93/4.5) was fed and the pressure inside the vessel was maintained at 18 Kg/cm²G. Such gas mixture was continuously fed for 3 hours to carry out gas phase polymerization. The subsequent procedure was carried out in the same manner as in Example 1.

Preliminary activation conditions, polymerization conditions and results are shown in Table 6.

EXAMPLE 17

Example 1 was repeated except that 1 Kg/cm²G of hydrogen was added in place of 40 ml (NTP) of hydrogen in Example 1, (2) and 1 Kg/cm²G of ethylene was added in place of propylene to carry out reaction at 50° C. for 20 minutes. Preliminary activation conditions, polymerization conditions and results are shown in Table 6.

COMPARATIVE EXAMPLE 14

Example 1 was repeated except that a gas mixture ($C_3^{--}/C_2^{--}$, ratio by weight: 99.5/0.5) was substituted for propylene in Example 1, (2). Preliminary activation conditions, polymerization conditions and results are shown in Table 6.

As is apparent from the results of Table 6, with regard to the order of addition of the reaction product (D), the product may be added in advance of reaction with propylene, as in Example 16, but addition after initiation of copolymerization as in Comparative example 13 is undesirable since the amount of $C_6$-extracts is large, Young's modulus is low and also adhesion of polymer onto the polymerization vessel occurs. Further in case where preliminary activation is carried out with ethylene in place of propylene as in Example 17, the same effectiveness is observed, but preliminary activation with a gas mixture as in Comparative example 14 is undesirable since polymer adhesion onto the polymerization vessel occurs and Young's modulus is reduced.

TABLE 6

| | Preliminary activation conditions, polymerization conditions and results | Example 16 | Compar. ex. 13 | Example 17 | Compar. ex. 14 |
|---|---|---|---|---|---|
| Preliminary activation conditions | (A) Titanium trichloride composition (g) | 0.31 | 0.30 | 0.32 | 0.31 |
| | (B) AlR₁R₂X (g) | DEAC 4.2 | same as left | same as left | same as left |
| | (C) α-Olefin (g/(A) g) | 150 | same as left | 120 | 160 |

TABLE 6-continued

| Preliminary activation conditions, polymerization conditions and results | | Example 16 | Compar. ex. 13 | Example 17 | Compar. ex. 14 |
|---|---|---|---|---|---|
| | Reaction conditions of (C), Kg/cm², °C., min. | 3 · 40 · 15 | same as left | 1 · 50 · 20 | 3 · 40 · 15 |
| | (D₁) Trialkylaluminum (g) | TEA 0.23 | none | TEA 0.23 | same as left |
| | (D₂) Aromatic ester (g) | MPT 0.16 | none | MPT 0.16 | same as left |
| | Reaction conditions of (D₁)/(D₂), °C., min. | 35 · 30 | none | 35 · 30 | same as left |
| | Adding manner of (D) to (A + B + C) | (A + B)←D ←C | none | after reaction of (A + B + C) | same as left |
| Polymerization conditions | Temperature (°C.) | 60 | same as left | same as left | same as left |
| | Pressure (Kg/cm²) | 18 | same as left | same as left | same as left |
| | Ratio by wt. of α-olefin/ C₃= initially fed | 1/9 | same as left | same as left | same as left |
| | Kind of α-olefin | C₄= | same as left | same as left | same as left |
| | Ratio by wt. of C₂=/C₃=/α-olefin | 2.5/93/4.5 | same as left | same as left | same as left |
| Polymerization results | Terpolymer yield (g) | 3,080 | 2,670 | 3,260 | 2,970 |
| | Yield as terpolymer g/(A) g | 9,935 | 8,900 | 10,867 | 9,581 |
| | (Polymer g/terpolymer g) %, in preliminary activation | 1.5 | 1.7 | 1.1 | 1.7 |
| | Adhesion of terpolymer onto inner wall of polymerization vessel | none | Yes (few) | none | Yes (much) |
| Composition of polymer | C₂= (%) | 2.5 | 2.6 | 3.5*² | 2.5 |
| | α-olefin (%) | 4.5 | 4.4 | 4.6 | 4.4 |
| | C₆ extracts (%) | 2.7 | 4.2 | 2.8 | 6.7 |
| Physical Properties of polymer | MFR | 8.5 | 9.2 | 8.4 | 8.8 |
| | BD | 0.49 | 0.45 | 0.47 | 0.38 |
| | MP according to DSC (°C.) | 143 | 143 | 142 | 143 |
| | Haze (%) | 0.6 | 0.7 | 0.9 | 1.0 |
| | Young's modulus (Kg/mm) | 155 | 145 | 155 | 140 |
| | Heat seal temperature (°C.) | 132 | 132 | 132 | 133 |
| | Content of copolymerized components*¹ | 3.8 | 3.8 | 3.7 | 3.8 |

*²This contains 1.1% of C₂= at the time of preliminary activation (C₂= at the time of copolymerization: 2.4%)

EXAMPLE 18

(1) Preparation of titanium trichloride composition:

TiCl₄ (1.8 mol) and n-hexane (800 ml) were introduced into a 2 l capacity glass reactor equipped with a slant blade stirrer and purged with nitrogen gas, and the contents were maintained at −5° C. by external cooling. A solution obtained by diluting 1.8 mol of DEAC with 336 ml of n-hexane and maintained at −5° C. to 0° C. was dropwise added to the above contents over 3 hours. After completion of the addition, the temperature of the contents was elevated up to 70° C. by external heating and maintained at this temperature for one hour to carry out reduction reaction of TiCl₄, followed by cooling the contents down to room temperature (20° C.) and then still standing. After the still standing, the contents separated into a solid precipitate and a supernatant liquid. This supernatant liquid was removed by slanting the reactor. n-Hexane (1 l) was added to the precipitate after separation of the supernatant liquid, and they were agitated for 10 minutes, followed by three times repeating a procedure of removing the supernatant liquid by decantation and slanting. Coexistent n-hexane was vaporized off under reduced pressure to dryness to obtain 276 g of a reduction solid product. The total amount of this solid product was then introduced into a 2 l glass reactor, and 560 ml of n-hexane were added to suspend the product with stirring. Diisoamyl ether (192 g) was added at 20° C., and the mixture was heated and reacted at 40° C. for one hour. The resulting reaction mixture was cooled down to room temperature (20° C.) and 800 ml of n-hexane were added, followed by stirring for 30 minutes and then still standing. The resulting supernatant liquid separated from a second precipitate was removed by slanting the reactor. To the second precipitate after removal of the supernatant liquid were added 1120 ml of n-hexane and 28 g of diisoamylether, and further 500 g of TiCl₄. The mixture was agitated for 2 hours at 65° C., followed by 5 times repeating a procedure of removing the supernatant liquid by decantation and then drying under reduced pressure to obtain 265 g of a titanium trichloride composition (A₃).

(2) Preparation of preliminarily activated catalyst:

Example 1 was repeated except that 0.3 g of the titanium trichloride composition (A₃) prepared above in the item (1) was employed in place of the titanium trichloride composition (A₂) in Example 1, (1), to obtain a preliminarily activated catalyst of the present invention (referred to as catalyst No. 18).

(3) Copolymerization:

Example 1 was repeated except that catalyst No. 18 was employed in place of catalyst No. 1 in Example 1, (3). Yield: 3,960 g. Preliminary activation conditions, polymerization conditions and composition, physical properties of the resulting terpolymer are shown in Table 7.

COMPARATIVE EXAMPLE 15

The procedures of Example 18 (1)~(3) were repeated except that the addition of the reaction product (D) of TEA with MPT during the preliminary activation procedure of Example 18, (2) was omitted. Yield: 2,810 g. Preliminary activation conditions, polymerization conditions and composition and physical properties of the resulting terpolymer are shown in Table 7.

As is apparent from Table 7, Comparative example 15 where the additive of the present invention was not added in the preliminary activation, is far less in the copolymer yield per titanium trichloride composition and much larger in the amount of $C_6$ extracts than Example 18, and moreover, copolymer adheres onto the inner wall of the polymerization vessel to make a long term continuous operation impossible. Further, what is decisive is that there is no great difference between the Example and the Comparative example in the physcial properties of polymer excluding the composition of the resulting copolymer, but Young's modulus of Comparative example 15 is 145 Kg/mm which is less than 150 Kg/mm as a practically required minimum value. Thus it is seen that the addition of definite additive in the preliminary activation in the process of the present invention is indispensable for attaining the object of the present invention (i.e. production of terpolymers having well-balanced physical properties).

for 15 hours to obtain a titanium trichloride composition ($A_1$).

(2) Preparation of preliminarily activated catalyst:

Into a 2 l capacity stainless steel reactor equipped with slant stirring blades and purged with nitrogen gas were fed 3 g of the titanium trichloride composition ($A_1$), 6 g of DEAC and 100 ml of n-hexane, and propylene was fed at a rate of 2 g/hr. at a temperature inside the reactor, of 30° C. to effect absorption-reaction for 2 hours. Thereafter a reaction product (D) (1.56 g) obtained by reacting 0.92 g of TEA with 0.64 g of MPT in 100 ml of n-hexane at 40° C. for 15 minutes was poured into the mixture obtained above of the titanium trichloride composition ($A_1$), polypropylene and others inside the reactor, together with the n-hexane, at room temperature to obtain a preliminarily activated catalyst of the present invention (hereinafter referred to as catalyst No. 19).

(3) Copolymerization:

n-Hexane (20 l) was introduced into a 50 l capacity stainless steel polymerization vessel equipped with slant

TABLE 7

| | Preliminary activation conditions, polymerization conditions and results | Example 18 | Compar. ex. 15 |
|---|---|---|---|
| preliminary activation conditions | (A) Titanium trichloride composition (g) | 0.50 | same as left |
| | (B) $AlR_1R_2X$ (g) | 4.2 | same as left |
| | (C) α-Olefin (g/(A) g) | 150 | same as left |
| | Reaction conditions of (C), $Kg/cm^2$, °C., min. | 3 · 40 · 15 | same as left |
| | ($D_1$) Trialkylaluminum (g) | TEA 0.38 | none |
| | ($D_2$) Aromatic ester (g) | MPT 0.27 | none |
| | Reaction conditions of ($D_1$)/($D_2$), °C., min. | 35 · 30 | — |
| | Adding manner of (D) to (A + B + C) | after reaction of (A + B + C) | none |
| Polymerization conditions | Temperature (°C.) | 60 | same as left |
| | Pressure ($Kg/cm^2$) | 18 | same as left |
| | Ratio by wt. of α-olefin/$C_3^=$ initially fed | 1/9 | same as left |
| | Kind of α-olefin | $C_4^=$ | same as left |
| | Ratio by wt. of $C_2^=/C_3^=$/α-olefin | 2.5/93/4.5 | same as left |
| Polymerization results | Terpolymer yield (g) | 3,960 | 2,810 |
| | Yield as terpolymer g/(A) g | 7,920 | 5,620 |
| | (Polymer g/terpolymer g) %, in preliminary activation | 1.9 | 2.7 |
| | Adhesion of terpolymer onto inner wall of polymerization vessel | none | Yes (few) |
| Composition of polymer | $C_2^=$ (%) | 2.5 | 2.6 |
| | α-olefin (%) | 4.6 | 4.4 |
| | $C_6$ extracts (%) | 2.8 | 4.7 |
| Physical properties of polymer | MFR | 9.5 | 9.3 |
| | BD | 0.47 | 0.45 |
| | MP according to DSC (°C.) | 142 | 143 |
| | Haze (%) | 0.7 | 0.8 |
| | Young's modulus (Kg/mm) | 155 | 145 |
| | Heat seal temperature (°C.) | 132 | 133 |
| | Content of copolymerized components[*1] | 3.8 | 3.9 |

EXAMPLE 19

(1) Preparation of titanium trichloride composition:

One hundred grams of titanium trichloride (TiCl$_3$·⅓AlCl$_3$) were introduced into a 1.5 l capacity steel ball mill together with 100 steel balls of 10 mm in diameter in nitrogen atmosphere, and further a reaction product obtained by mixing and reacting 5.0 of diethyl ether with 1.0 g of TiCl$_4$ at room temperature was added, followed by milling them at room temperature to 40° C.

turbine blades and purged with nitrogen gas and then evacuated, and thereafter the total amount of the catalyst No. 19 obtained above and 25 Nl of hydrogen gas were fed. While the temperature inside the reactor was maintained at 60° C., a gas mixture of propylene/butene-1 (ratio by weight: 9/1) was fed to the polymerization vessel till the pressure inside the vessel reached 10 Kg/cm$^2$G. Successively, a gas mixture ($C_2^{--}/C_3^{--}/C_4^{--}$, ratio by weight: 2.5/93.0/4.5) (at 55° C.) was fed and the pressure inside the vessel was maintained at 10 Kg/cm$^2$G. The gas mixture was continuously fed for 3 hours to carry out polymerization reaction in the form of slurry. Feed of the gas mixture was then stopped, and unreacted gas mixture inside the vessel was purged till it reached 0 Kg/cm$^2$G to substantially complete the copolymerization reaction. Methanol (3 l) was then added to the vessel to carry out catalyst killing reaction at 70° C. for 30 minutes. Water (10 l) was then added to the vessel, and the contents were agitated at room temperature for 30 minutes, followed by still standing. The resulting separated water-methanol layer was withdrawn, and again water (10 l) was added to the remaining portion (n-hexane layer), followed by stirring at room temperature for 10 minutes and then filtering-off and drying of polymer. Yield: 3,920 g. Preliminary activation conditions, polymerization conditions and composition and physical properties of the resulting terpolymer are shown in Table 8.

EXAMPLE 20

Example 19 was repeated except that TEA (0.90 g) and ethyl benzoate (EBZ) (1.23 g) were employed in place of TEA-MPT in the reaction product (D) of Example 19, (2). Yield: 3,870 g. Preliminary activation conditions, polymerization conditions and composition and physical properties of the resulting terpolymer are shown in Table 8.

EXAMPLE 21

Example 19 was repeated except that 0.92 g of TEA and 1.44 g of ethyl p-anisate (hereinafter abbreviated to EPAN) were exployed in place of TEA-MPT in the reaction product (D) of Example 19 (2). Yield: 3,820 g. Preliminary activation conditions, polymerization conditions and composition and physical properties of the resulting terpolymer are shown in Table 8.

COMPARATIVE EXAMPLES 16, 17 AND 18

Example 19 was repeated except that with regard to the preliminary activation of Example 19, (2), (a) the whole of the preliminary activation was omitted (Comparative example 16); (b) the addition of TEA-MPT in the preliminary activation was omitted (Comparative example 17); or (c) propylene feed in the preliminary activation was omitted (Comparative example 18). Yields: (a) 3,060 g, (b) 2,950 g and (c) 3,580 g, respectively. Preliminary activation conditions, polymerization conditions and compositions and physical properties of the resulting terpolymers are shown in Table 8.

COMPARATIVE EXAMPLE 19

Example 19 was repeated except that with regard to the preliminary activation of Example 19, (2), (a) diethylene glycol dimethyl ether (abbreviated to dyglyme) was added in advance of the treatment of titanium trichloride composition (A$_1$) and organoaluminum compound with propylene, in place of the procedure of adding the reaction product of TEA with MPT after the treatment of the titanium trichloride composition (A$_1$) and organoaluminum with propylene; and further with regard to the copolymerization of Example 19, (3), (b) ethylene was not admixed in the initially fed gas as well as in the continuously fed gas during polymerization, but intermittently fed, i.e. fed at an interval of 30 minutes after initiation of polymerization, 6 times, each time for 5 minutes and in an amount of 20 g. Yield: 5,120 g. Preliminary activation conditions, polymerization conditions and composition and physical properties of the resulting terpolymer are shown in Table 8.

As is apparent from Table 8, comparison of the results of Comparative example 19 with those of Example 19 or Comparative example 16 (no diglyme, ethylene was continuously fed) are as follows:

(a) Copolymer g/(A) g:
  Example 19 > Comparative example 19 > Comparative example 16
(b) Composition of polymer:
  Almost no difference.
(c) Amount of C$_6$ extracts:
  Comparative example 16 > Comparative example 19 > Example 19
(d) Physical properties of polymer:
  Almost no difference, but Comparative examples 16 and 19 are considerably low in BD.

As described above, according to the process wherein diglyme is added at the time of treatment with propylene and intermittent feed of ethylene, in place of the preliminary activation of the present invention, the yield of terpolymer per unit amount of titanium trichloride composition is low and also the amount of C$_6$ extracts in terpolymer is large.

TABLE 8

| | | Example | | | Comparative example | | | |
|---|---|---|---|---|---|---|---|---|
| | | 19 | 20 | 21 | 16 | 17 | 18 | 19 |
| Preliminary activation conditions | (A) Titanium trichloride composition (g) | 3.0 | same as left | same as left | 3.0 | same as left | same as left | 5.0 |
| | (B) $AlR_1R_2X$ (g) | DEAC 6.0 | same as left | same as left | DEAC 6.0 | same as left | same as left | same as left |
| | (C) α-Olefin (g/(A) g) | 0.9 | same as left | same as left | none | 0.9 | none | 1.2 |
| | Reaction conditions of (C), Kg/cm², °C., min. | 30 · 120 | same as left | same as left | none | 30 · 120 | none | 30 · 120 |
| | ($D_1$) Trialkylaluminum (g) | TEA 0.92 | TEA 0.90 | TEA 0.92 | none | none | TEA 0.92 | none |
| | ($D_2$) Aromatic ester (g) | MPT 0.14 | EBZ 1.23 | EPA 1.44 | none | none | MPT 0.64 | none |
| | Reaction conditions of ($D_1$)/($D_2$), °C., min. | 40 · 15 | same as left | same as left | none | none | 40 · 15 | none |
| | Adding manner of (D) to (A + B + C) | after reaction of (A + B + C) | same as left | same as left | none | none | after reaction of (A + B + C) | none*⁴ Addition of diglyme to (A + B) |
| Polymerization conditions | Temperature (°C.) | 60 | same as left | same as left | 60 | same as left | same as left | 60 |
| | Pressure (Kg/cm²) | 10 | same as left | same as left | 10 | same as left | same as left | same as left |
| | Ratio by wt. of α-olefin/$C_3^=$ initially fed | 1/9 | same as left | same as left | 1/9 | same as left | same as left | same as left |
| | Kind of α-olefin | $C_4^=$ | same as left | same as left | $C_4^=$ | same as left | same as left | same as left |
| | Ratio by wt. of $C_2^=/C_3^=$/α-olefin | 2.5/93/4.5 | same as left | same as left | 2.5/93/4.5 | same as left | same as left | 0/90/10*⁵ |
| Polymerization results | Terpolymer yield (g) | 3,920 | 3,870 | 3,820 | 3,060 | 2,950 | 3,580 | 5,120 |
| | Yield as terpolymer g/(A) g | 1,306 | 1,290 | 1,270 | 1,020 | 983 | 1,190 | 1,024 |
| | (Polymer g/terpolymer g) %, | 0.07 | 0.07 | 0.07 | none | 0.09 | none | 0.12 |
| | Adhesion of terpolymer onto inner wall of polymerization vessel in preliminary activation | none | none | none | Yes (much) | none | Yes (few) | none |
| Composition of polymer | $C_2^=$ (%) | 2.4 | 2.5 | 2.5 | 2.4 | 2.6 | 2.4 | 2.5 |
| | α-olefin (%) | 4.6 | 4.5 | 4.4 | 4.6 | 4.6 | 4.5 | 4.6 |
| | $C_6$ extracts (%) | 2.8 | 3.0 | 2.8 | 8.5 | 5.7 | 4.6 | 3.8 |
| Physical properties of polymer | MFR | 8.5 | 8.7 | 8.1 | 9.2 | 9.5 | 8.8 | 8.5 |
| | BD | 0.48 | 0.48 | 0.49 | 0.40 | 0.46 | 0.42 | 0.42 |
| | MP according to DSC (°C.) | 143 | 143 | 143 | 143 | 143 | 142 | 143 |
| | Haze (%) | 0.8 | 0.8 | 0.7 | 0.8 | 0.9 | 0.9 | 0.7 |
| | Young's modulus (Kg/mm) | 160 | 160 | 160 | 150 | 155 | 155 | 160 |
| | Heat seal temperature (°C.) | 132 | 132 | 132 | 132 | 132 | 132 | 133 |
| | Content of copolymerized components*¹ | 3.7 | 3.8 | 3.7 | 3.7 | 3.9 | 3.7 | 3.8 |

(Note)
*¹Polymer dissolved in hexane as polymerization solvent
*⁴Diethylene glycol dimethyl ether 0.05 ml
*⁵Ethylene was intermittently fed, 29 g × 6 times

COMPARATIVE EXAMPLE 20

Example 1 was repeated except that 0.17 g of DEAC was employed in place of TEA as $D_1$ in the preliminary activation. The results are shown in Table 9.

COMPARATIVE EXAMPLE 21

Example 1 was repeated except that 0.18 g of monoethylaluminum dichloride was employed in place of TEA as $D_1$ in the preliminary activation. The results are shown in Table 9.

As is apparent from the results of Table 9, when dialkylaluminum monohalide is employed in place of trialkylaluminum in the preliminary activation, the polymerization activity is low and the amount of $C_6$ extracts is large. Further, when monoalkylaluminum dihalide is employed in place thereof the polymerization activity is further reduced and the amount of $C_6$ extracts is large, resulting in adhesion of terpolymer onto the inner wall of the polymerization vessel and reduction in Young's modulus.

TABLE 9

| Polymerization results | Comparative example 20 | 21 |
|---|---|---|
| Polymerization results | | |
| Terpolymer yield (g) | 2,090 | 1,530 |
| Yield, terpolymer (g)/(A)g | 6,970 | 5,110 |
| Polymer g/terpolymer g (%) | 1.4 | 1.6 |
| Adhesion of polymer onto inner wall of polymerization vessel | none | Yes (few) |
| Composition of polymer | | |
| $C_3^=$ % | 2.5 | 2.6 |
| α-olefin % | 4.5 | 4.4 |
| amount of $C_6$ extracts | 3.5 | 6.3 |
| Physical properties of polymer | | |
| MFR | 8.4 | 8.7 |
| BD | 0.48 | 0.44 |
| MP (°C.) | 143 | 143 |
| Haze (%) | 0.80 | 0.80 |
| Young's modulus, Kg/mm | 150 | 140 |
| Heat-seal temperature, °C. | 133 | 133 |
| Content of copolymerized*[1] components (%) | 3.8 | 3.9 |

What is claimed is:

1. A process for producing terpolymers of ethylene, propylene and another alpha-olefin, which comprises
   (a) preliminarily activating a catalyst consisting of a titanium trichloride composition obtained by reacting a reaction product (I) of ($A_2$) an organoaluminum compound with an electron donor, with $TiCl_4$ to obtain a solid product (II), which is further reacted with an electron donor and an electron acceptor and an organoaluminum halide expressed by the general formula $AlR_1R_2X$ wherein $R_1$ and $R_2$ are the same or different alkyl, aryl or alkaryl groups and X represents a halogen atom, with an alpha-olefin of 2 to 12 carbon and a reaction product of a trialkylaluminum and an aromatic ester, and
   (b) copolymerizing 1.0 to 3.5% by weight of ethylene, 88 to 96% by weight of propylene and 1.0 to 10.0% by weight of another alpha-olefin of 4 to 12 carbon atoms based on the total weight of these monomers, in the presence of the preliminarily activated catalyst of step (a).

2. A process according to claim 1 wherein said preliminary activation is carried out so that the amount of poly-α-olefin formed in the preliminary activation corresponds to 1 to 5% by weight based on the weight of the terpolymers after said copolymerization.

3. A process according to claim 1 wherein said copolymerization is carried out at a temperature of 45° to 65° C.

4. A process according to claim 1 wherein said preliminary activation is carried out by reacting said α-olefin with the combination of a titanium trichloride composition with an organoaluminum halide expressed by said general formula $AlR_1R_2X$, and thereafter adding to the resulting reaction product, a reaction product of a trialkylaluminum with an aromatic ester.

5. A process according to claim 1 wherein said preliminary activation is carried out by adding a titanium trichloride composition, an organoaluminum halide expressed by the general formula $AlR_1R_2X$, and a reaction product of a trialkylaluminum with an aromatic ester in the presence of said α-olefin.

6. A process according to claim 1 wherein said preliminary activation is carried out by reacting said α-olefin with a mixture of a titanium trichloride composition, an organoaluminum halide, and a reaction product of a trialkylaluminum with an aromatic ester.

7. A process according to claim 1 wherein said aromatic ester is an aromatic carboxylic acid ester.

* * * * *